Oct. 3, 1933.　　　　　N. D. ABBEY　　　　　1,928,921
SWAGING
Filed Sept. 5, 1930
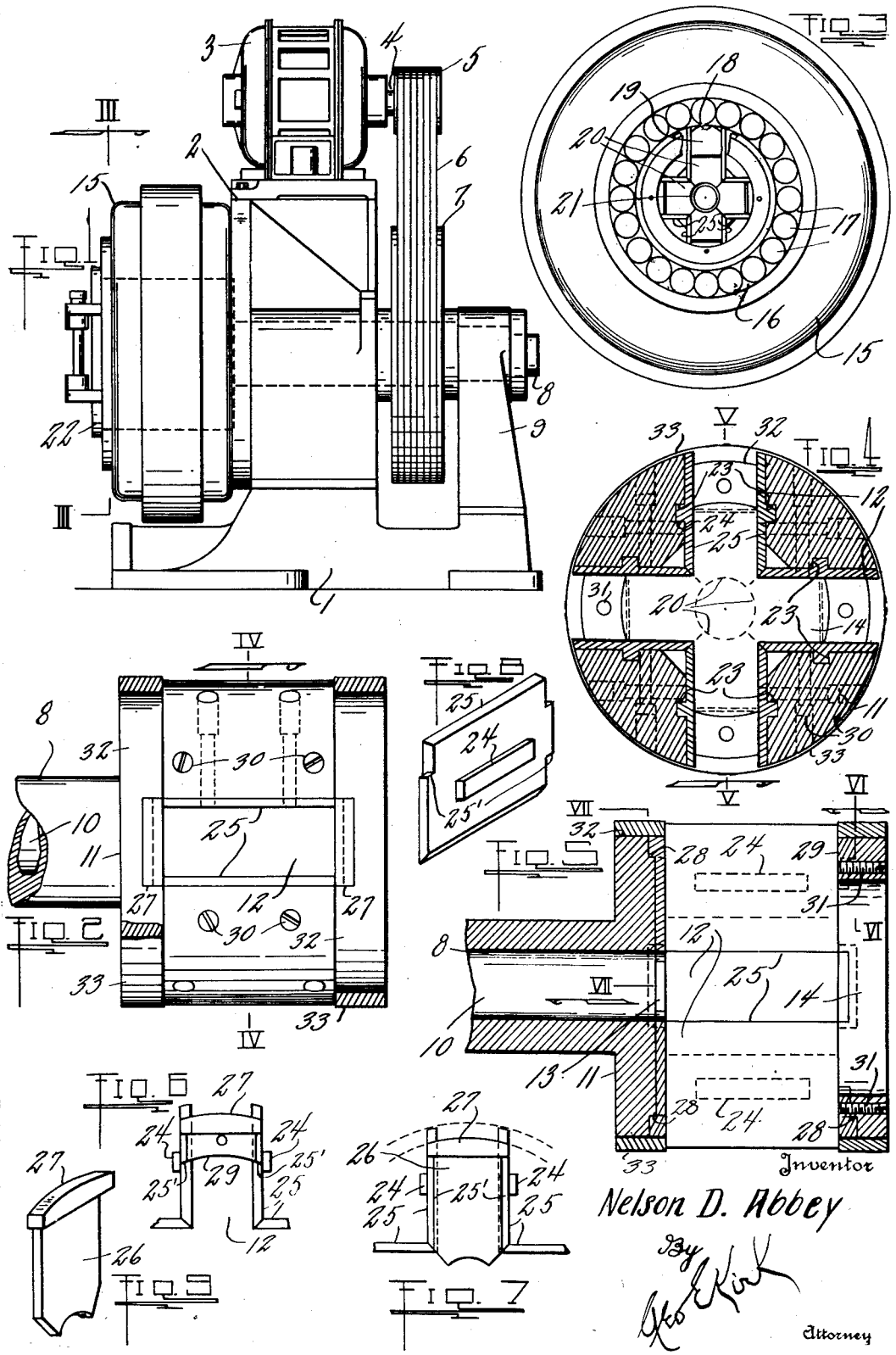
Inventor
Nelson D. Abbey
By
Geo E Kirk
Attorney Patented Oct. 3, 1933

1,928,921

UNITED STATES PATENT OFFICE 1,928,921

SWAGING

Nelson D. Abbey, Toledo, Ohio, assignor to The Etna Machine Company, Toledo, Ohio, a corporation of Ohio Application September 5, 1930. Serial No. 479,843

4 Claims. (Cl. 78—21)

This invention relates to holding and directing working elements in tools.

This invention has utility when incorporated in power operated impacting devices, more particularly in so-called swagers, coacting for surrounding the work.

Referring to the drawing:

Fig. 1 is a side elevation of an embodiment of the invention in a swager;

Fig. 2 is a fragmentary detailed view of the swager head;

Fig. 3 is a view on the line III—III, Fig. 1, a part of the head being broken away;

Fig. 4 is a section on the line IV—IV Fig. 2;

Fig. 5 is a section on the line V—V Fig. 4;

Fig. 6 is a detail view of the way lining from the major opening end of the head;

Fig. 7 is a detail view of the way lining from the minor or smaller opening end of the head;

Fig. 8 is a perspective view of a way side or lining element; and

Fig. 9 is a perspective view of a way end lining element.

Base 1 is shown as having main frame 2 rising therefrom carrying motor 3, having shaft 4 provided with pulley 5, connected by belt 6 to pulley 7 on main shaft 8 carried by bearing 9 rising from the base 1 and also having bearing in the frame 2. The shaft 8 is tubular, having opening 10 therethrough. This shaft 8, remote from the bearing 9, has enlargement providing head 11, with radial ways 12 therefrom in communication by axial opening 13 with the opening 10. Opposite this opening 13, the head 11 has major opening 14.

Fast with the frame 2 is shell 15 providing way 16 for rollers 17 in an annular series about the head 11. In normal operation relative rotation is effected between the shell 15 and the head 11 with rollers 17 effecting impacting.

This impacting by the rollers 17 is against convex faces 18 of hammers 19 thereby actuating dies 20 inward against work 21 inserted into the swager through opening 14 past or through door 22. These impacting operations occur with a rapid frequency and very short travel distance in the rotation of the shaft as the head of the shell is held stationary. In this mode of working metal, the stresses and pressures are very high, and in accordance with the invention herein provision is made not only to prolong the life of the machine but to make possible its upkeep for a high degree of accuracy and consequent efficiency. To this end the wear faces of the head are armored or lined. The ways 12 have under-cut recesses 23 into which project lugs 24 of sides 25, thereby keying or holding each side against radial movement. The pair of sides as to a way 12 are held in position by end 26 having overhang 27 coacting with lugs 25 on the plates and with ledge 28 in the head 11, thereby precluding shifting of the end 26 radially inward to interfere with the opening or port 13. Opposite this end 26 is minor end 29 also provided with overhang 27 which may seat on ledge 28. The sides 25 may be located by screws 30 against shifting relatively to the head. Screws 31 may hold the ends 29, in position. With the sides located and the ends assembled therewith there is interlocking for maintaining this lining in the ways 12.

The head 11 terminally is provided with reduced diameter portions 32 upon which may be sweat wear bands or tracks 33 overhanging the ends 26, 29, and thus providing a supplemental holding for the way linings effective even in the absence of the screws 30, 31. Inasmuch as the hammering operation is very severe these sweat-on bands insure maintained assembly of the head with no tendency to work loose as might arise with screws or bolts. The outside diameter of these bands 33 is such as to provide a wear track for the rolls 17 clear of the intermediate portions of the head 11 between the ways 12. Thus follows that these replaceable bands of wear material carry the working load of the rollers 17 while the replaceable linings in the ways 12 provide the directing guides for the hammers and die elements.

What is claimed and it is desired to secure by United States Letters Patent is:

1. In a swager embodying a rotary head, there being radially extending ways in the head, said ways having opposing pairs of parallel sides, tools in the ways, an enveloping shell for the head forming a chamber about the head into which the ways are opened, there being a work receiving guide axially of the head, rollers in the chamber effective between the head and shell upon the tools for acting upon the work, there being seats in opposite sides of said ways, said seats including recesses, and pairs of parallel plates in said seats, the plates of a pair being on opposite sides of a common radius from the axis of the guide, said plates having lugs extending into said recesses.

2. In a swager embodying a rotary head, there being radially extending ways in the head, said ways having opposing pairs of parallel sides, tools in the ways, an enveloping shell for the head forming a chamber about the head into which the ways are opened, there being a work receiving guide axially of the head, rollers in the chamber effective between the head and shell upon the tools for acting upon the work, there being seats in said opposing sides of said ways, pairs of parallel plates in said seats, the plates of a pair being on opposite sides of a common radius from the axis of the guide, said plates providing way sides between the ways clear of being engaged by said rollers, and head embracing band means retaining the way sides against outward shifting.

3. In a swager embodying a rotary head, there being radially extending ways in the head, said ways having opposing pairs of parallel sides, tools in the ways, an enveloping shell for the head forming a chamber about the head into which the ways are opened, there being a work receiving guide axially of the head, rollers in the chamber effective between the head and shell upon the tools for acting upon the work, there being seats in opposite sides of said ways, and opposing pairs of end and side plates in said seats on opposite sides of the common radius from the axis of the guide, said way ends having coacting means with the way sides to thrust said sides into held position as assembled in said head.

4. In a swager embodying a rotary head, there being radially extending ways in the head, said ways having opposing pairs of parallel sides, tools in the ways, an enveloping shell for the head forming a chamber about the head into which the ways are opened, there being a work receiving guide axially of the head, rollers in the chamber effective between the head and shell upon the tools for acting upon the work, there being seats in opposite sides of said ways, opposing pairs of end and side plates in said seats on opposite sides of the common radius from the axis of the guide, said way ends having coacting means with the way sides to thrust said sides into held position as assembled in said head, and head embracing bands retaining the way ends in the head.

NELSON D. ABBEY.